United States Patent
Weekamp et al.

(10) Patent No.: US 6,960,738 B2
(45) Date of Patent: Nov. 1, 2005

(54) METAL-CERAMIC BOND

(75) Inventors: Johannus Wilhelmus Weekamp, Eindhoven (NL); Durandus Kornelius Dijken, Eindhoven (NL); Theodorus Johannes Maria Jacobus Van Gennip, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 4 days.

(21) Appl. No.: 10/478,738

(22) PCT Filed: May 24, 2002

(86) PCT No.: PCT/IB02/01856
§ 371 (c)(1),
(2), (4) Date: Nov. 24, 2003

(87) PCT Pub. No.: WO02/096826
PCT Pub. Date: Dec. 5, 2002

(65) Prior Publication Data
US 2004/0149809 A1 Aug. 5, 2004

(30) Foreign Application Priority Data
May 29, 2001 (EP) ............................................. 01202033

(51) Int. Cl.$^7$ .............................................. B23K 31/02
(52) U.S. Cl. ............................ 219/121.64; 219/121.66; 228/120; 228/165
(58) Field of Search ....................... 219/121.63, 121.64, 219/121.65, 121.66; 228/174, 120, 165; 403/30, 270, 271, 404, 41

(56) References Cited

U.S. PATENT DOCUMENTS

| | | | | | |
|---|---|---|---|---|---|
| 3,770,529 | A | * | 11/1973 | Anderson | ..................... 164/10 |
| 5,028,162 | A | * | 7/1991 | Tsuno et al. | .................. 403/30 |
| 5,188,164 | A | * | 2/1993 | Kantner et al. | ................ 164/97 |
| 5,247,986 | A | * | 9/1993 | Kantner et al. | ................ 164/97 |

* cited by examiner

*Primary Examiner*—Jonathan Johnson

(57) ABSTRACT

A method of connecting a metal (1) with a ceramic material (2) comprises the steps of providing a through-hole (3) in the ceramic material and positioning the metal (1) to be connected to the ceramic material (2) proximate to the ceramic material (2) with the through-hole (3). Subsequently, the metal (1) is melted (7) proximate to the through-hole (3). A pressure difference prevails between the side of the ceramic (2) remote from the metal and the side of the metal (1) remote from the ceramic material (2). A larger pressure prevails at the side of the metal (1) remote from the ceramic material (2). The pressure difference causes the melt (7) to be pressed into the through-hole (3) in the ceramic material (2). The through-hole (3) has such a shape that, after solidification, the solidified material (14) and the through-hole (3) have a complementary locking form.

9 Claims, 3 Drawing Sheets

METAL-CERAMIC BOND

Figure 1:
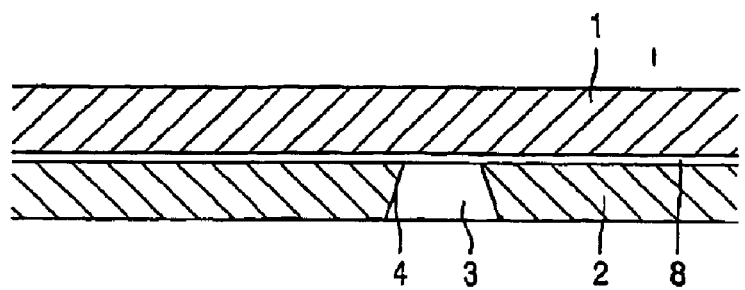

The invention relates to a method of connecting two different materials, the method comprising the steps of providing a through-hole in one material, melting the other material proximate to the through-hole and subsequently allowing it to solidify in the through-hole.

The invention also relates to a composite structure of a metal and a non-metal part.

Such a method and composite structure are known from the U.S. Pat. No. 5,498,850. This patent describes a structure comprising a metal plate and a plate of semiconductor material, the metal plate having a through-hole. The semiconductor material is subsequently illuminated with an intensive laser beam via the through-hole and caused to melt. The molten semiconductor material also causes a part of the metal to melt. The molten metal forms an alloy with the molten semiconductor material. The alloy is not resistant in air and must be provided with a separate cover layer.

The method described has the drawback that it has various stages and does not offer a solution for connecting a metal and a ceramic material.

It is an object of the invention to provide a method and a composite structure as described above, in which a reliable bond between the ceramic material and the metal is achieved with great positional accuracy and temperature stability.

To this end, a method according to the invention is characterized in that one material is a ceramic material, in that the other material is a metal and in that, in the molten state of the metal, a pressure difference prevails between the side of the metal remote from the ceramic material and the side of the ceramic material remote from the metal, a larger pressure prevailing on the side of the metal remote from the ceramic material.

According to the invention, a composite structure is characterized in that the non-metal part is a ceramic part, in that the ceramic part is provided with a through-hole and in that, in the molten state, the metal part has penetrated the through-hole and has solidified.

In this way, the penetration of the molten metal in the through-hole is brought about in an active manner. It is also achieved that no special adaptations to the materials and no time-consuming process, such as thermal compression, are necessary.

A preferred embodiment of a method according to the invention is characterized in that, after the metal has been caused to melt proximate to the through-hole, the pressure difference is brought about by causing the molten metal on the side of the metal remote from the ceramic material to evaporate.

This means that no materials and resources other than the metal and the ceramic material itself or means for causing the metal to melt and evaporate are necessary.

A preferred embodiment of the method according to the invention is further characterized in that the evaporation takes place by subjecting the side of the molten metal remote from the ceramic material to laser radiation which causes a surface layer of the molten metal to evaporate.

This means that a single laser of sufficient power can be used, first with a relatively low power to cause the metal to melt proximate to the through-hole and then, when the metal has melted, to apply a high-power laser pulse to the melt so that a surface layer of the melt evaporates. The evaporating metal ensures an increase of pressure as a result of which the melt is pressed into the through-hole. In addition to the increase of pressure, the fact that the evaporating metal carries with it a pulse directed away from the metal and the ceramic material, as a result of which the metal in the melt receives a pulse in the direction of the through-hole, will also play a role.

The further preferred embodiment of a method according to the invention is characterized in that, due to the solidification of the molten metal, a locking form is created between the metal and the ceramic material.

It is known that, in general, metal and ceramic material never or hardly ever adhere to each other. Adhesion, if occurring at all, takes place at a high temperature, with the ceramic material and the molten metal having approximately the same temperature.

It is achieved by the present preferred embodiment of the method according to the invention that the ceramic material and the molten metal do not need to have substantially the same high temperature in order to bring about the bond. Due to the locking form created after the solidification of the molten metal, the strength of the bond between the metal and the ceramic material is almost exclusively determined by the strength of the locking form.

Figure 2:
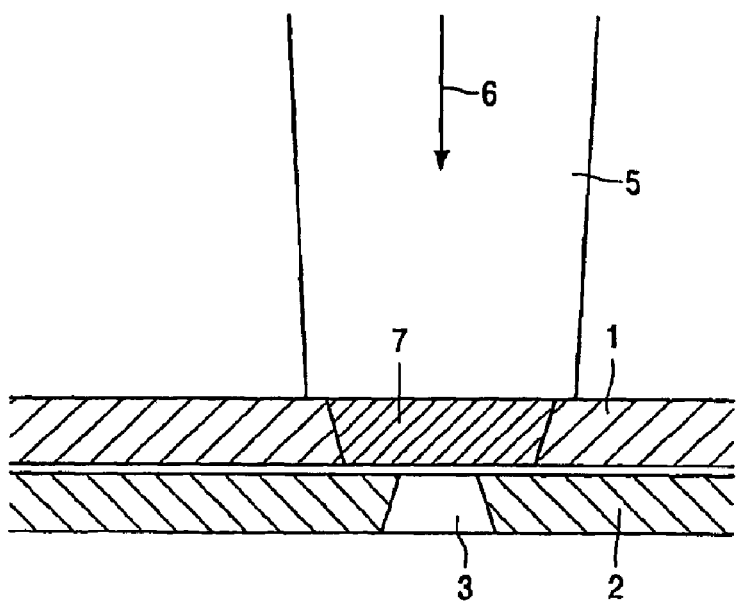
Figure 3:
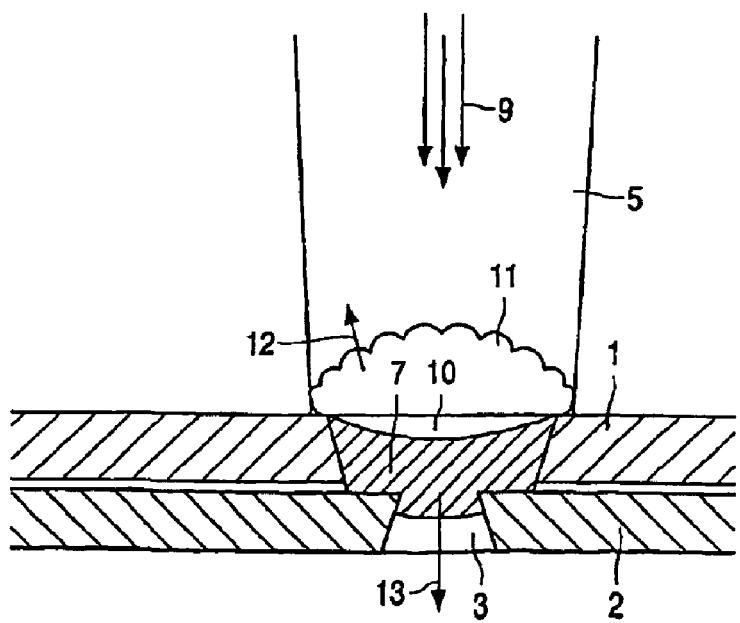
Figure 4:
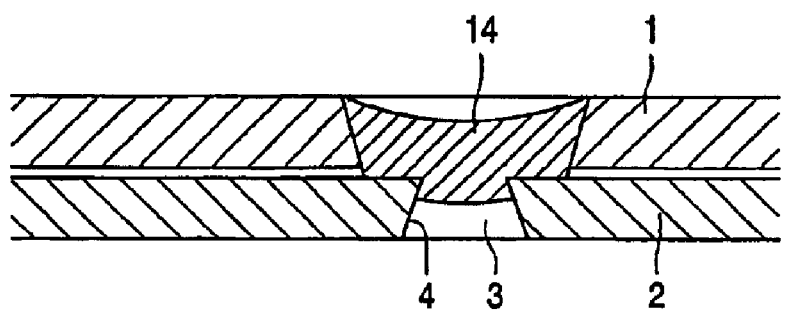
Figure 5:
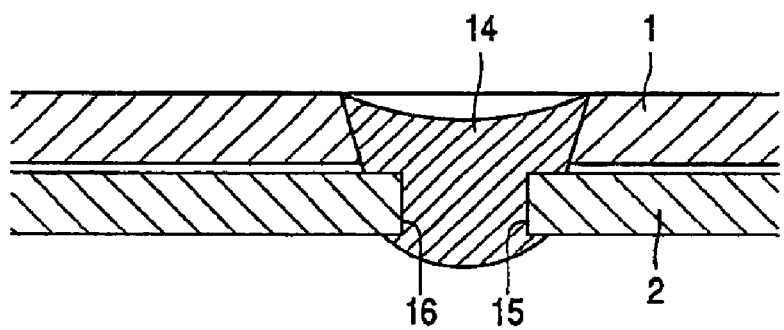
Figure 6:
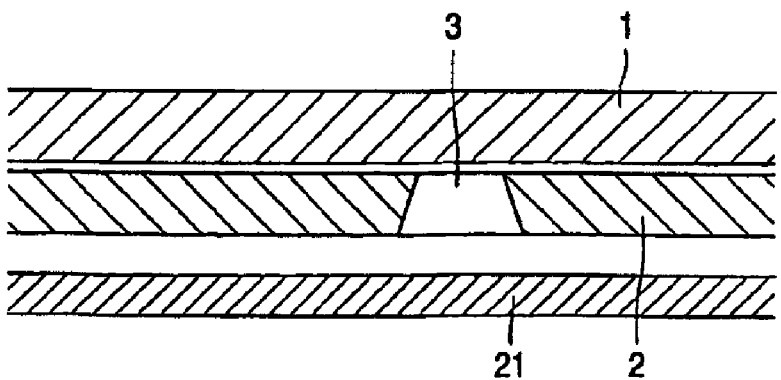
Figure 7:
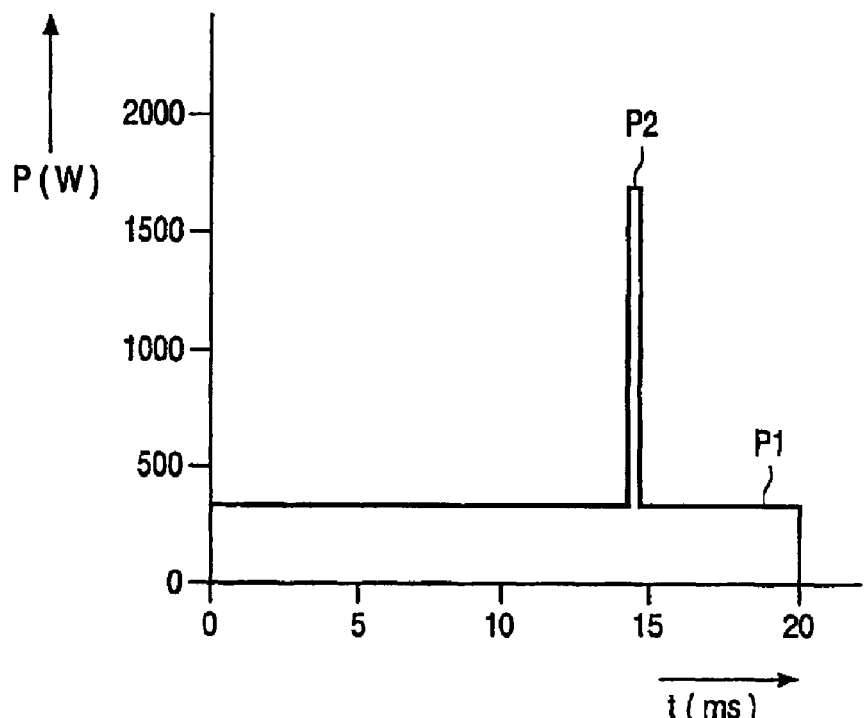
Figure 8:
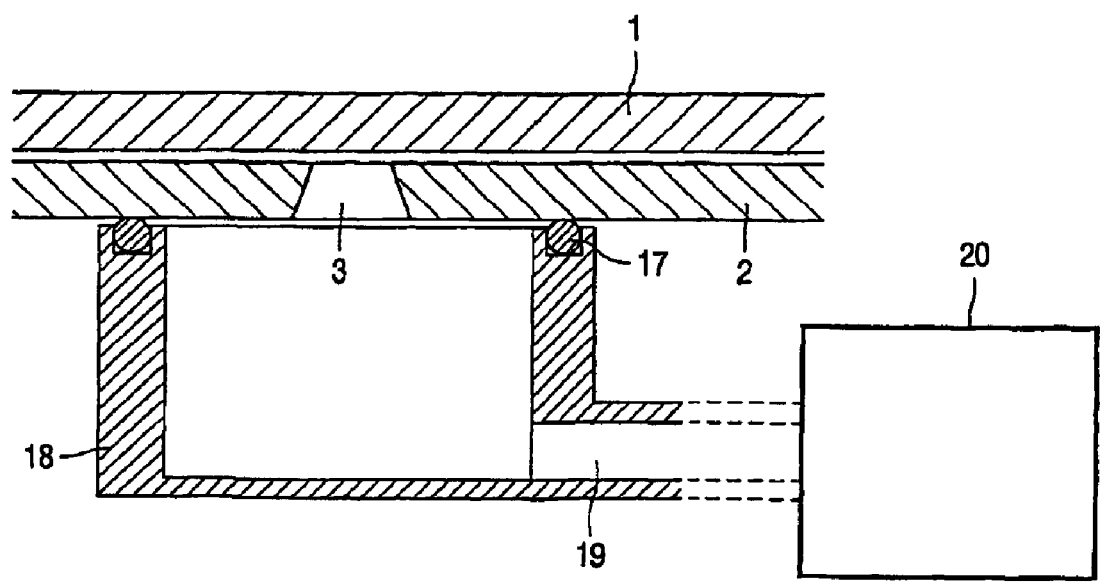

The invention will now be elucidated with reference to the accompanying drawings in which:

FIG. 1 shows a metal and a ceramic part;
FIG. 2 shows the step of melting the metal;
FIG. 3 shows the step of applying a pressure difference;
FIG. 4 shows the bond between the metal and the ceramic part;
FIG. 5 shows another embodiment of a bond between the metal and the ceramic part;
FIG. 6 shows a stop means;
FIG. 7 shows the power of a laser pulse as a function of time;
FIG. 8 shows an alternative manner of applying a pressure difference.

In FIG. 1, reference numeral 1 denotes a metal part and reference numeral 2 denotes a ceramic part. The ceramic part 2 is provided with a through-hole 3 with walls 4 tapering in the direction of the metal part. The metal part 1 and the ceramic part 2 are shown in FIG. 1 by way of example as a cross-section of two flat plates. The plates 1 and 2 may of course also be curved and the parts 1 and 2 can also have a shape other than flat.

In FIG. 2, reference numeral 5 denotes a laser beam which, in the direction of the arrow 6, engages the metal part 1 on the side remote from the ceramic part 2. The laser beam 5 has such an intensity that the metal part 1 at the location of the through-hole 3 is caused to melt, which is indicated by melt 7. The intensity of the laser beam 5 is not sufficient to cause the melt 7 to boil. The resultant situation is stable. It is to be noted that the space 8 in the Figures between the metal part 1 and the ceramic part 2 is not relevant to the invention and is preferably absent. The space 8 is only shown in the Figures to illustrate the difference between metal part 1 and ceramic part 2.

After the laser beam 5 has created the melt 7, the intensity of the laser beam 5 is increased for a short time, as is indicated by the arrows 9, to such a level that a surface layer 10 of the melt 7 evaporates to a vapor cloud which is denoted by reference numeral 11. The extension of the vapor cloud 11 in the direction away from the metal part 1 has the result that a force, as indicated by the arrow 12, is exerted in the direction of the ceramic part 2 on the surface 10 of the melt 7, as is indicated by arrow 13. As a result, the melt 7 moves in the direction of the arrow 13 and therefore in the direction of the through-hole 3. After a short time, the laser beam 5 is switched off and the melt 7 has penetrated the through-hole 3. As a result of switching off the laser beam 5, the melt 7 will cool down and solidify and a solidified material 14 will be formed, as is shown in FIG. 4.

FIG. 4 shows that the solidified material 14 along with the tapering wall 4 of the through-hole 3 constitutes a locking form. The locking form ensures that the metal part 1 and the ceramic part 2 are bonded firmly together via the solidified material 14.

The bond thereby achieved between the metal part 1 and the ceramic part 2 has a high level of positional accuracy, namely the accuracy with which the through-hole 3 is provided in the ceramic part 2 and the accuracy with which the ceramic part 2 provided with the through-hole 3 and the metal part 1 are positioned in relation to each other. The bond achieved in this way also has a greater temperature stability. As long as the solidified material 14, and thus the metal part 1, do not melt, the metal part 1 and the ceramic part 2 retain the relative positions they took when the melt 7 turned into solidified material 14.

It will be evident from the foregoing that neither the metal part 1 nor the ceramic part 2, with the exception of the provision of the through-hole 3, have undergone any process. In particular, neither part has undergone a surface treatment or a surface treatment with another material such as a flux or a bonding agent.

It will further be evident from the above description that no additional materials are necessary in order to bring about the bond. In particular it is to be noted that no solder or other third material is necessary in order to form the bond between the metal part 1 and the ceramic part 2.

In the embodiments shown in FIGS. 1 to 4, the through-hole 3 is shown as an opening tapering in the direction of the metal part 1. For those skilled in the art, openings with a form other than a taper will also yield a locking form between the solidified material 14 and the ceramic part 2. A particular shape of a locking form within the context of the present invention is shown in FIG. 5. In FIG. 5, the through-hole 3 has straight walls 4 and the locking form is formed in that the melt 7, as a result of the pressure difference applied between the side of the metal part 1 remote from the ceramic part and the side of the ceramic part 2 remote from the metal part 1, where the larger pressure prevails on the side of the metal part 1 remote from the ceramic part 2, the melt 7 is pushed through the through-hole 3 and then flows over the edge 15 and then solidifies into the solidified material 14. Together with the edge 15, the edge 16 of the solidified material 14 that protrudes over the edge 15 constitutes a locking form that secures the solidified material 14, the metal part 1 and the ceramic part 2 to each other.

In the event that the pressure difference is too great and/or is present too long, there is a risk that the melt 7 will be pushed completely through the through-hole 3 and that no bond at all will be created between the metal part 1 and the ceramic part 2. FIG. 6 shows a solution to this problem. Right under the through-hole 3, a stop means 21 is provided. In connection with the high temperatures of the melt 7 and in connection with the desire that the melt 7 should not adhere to the stop means 21, at least the part of the surface of the stop means 21 facing the through-hole 3 is manufactured of a ceramic material, or the stop means 21 is manufactured of a material having a high thermal conductivity coefficient. The larger the temperature difference between the melt 7 and the ceramic material 2, the smaller the risk that the melt 7 will adhere to a ceramic surface of the stop means 21. A temperature difference of more than 50° C. between the melt 7 and the ceramic material of the stop means 21 is generally sufficient to ensure that the melt 7 does not adhere to the stop means 21 at high temperatures.

If the stop means 21 is made of a material having a high thermal conductivity coefficient, the molten metal that penetrates the hole 3 will cool down so quickly on contact that there is no or no significant adhesion.

FIG. 8 shows another way of achieving a pressure difference between the side of the metal part 1 remote from the ceramic part 2 and the side of the ceramic part 2 remote from the metal part 1. Around the through-hole 3, a holder 18 is positioned against the ceramic part 2 by means of an O-ring 17. The holder 18 is connected by means of a connecting tube 19 to a device 20 for generating a sub-atmospheric pressure in the holder 18. After a melt 7 has been created in the metal part 1 opposite to the through-hole 3, the device 20 ensures that there is a short-lasting sub-atmospheric pressure in the holder 18. As a result of the pressure difference, the melt 7 is pressed into the through-hole 3. The pressure difference is then reduced again as a result of which the melt 7 does not penetrate the hole 3 any further and the melt 7 is cooled to form the solidified material 14.

In the embodiment shown in FIG. 8, the stop means 21 may be positioned, for example, rigidly in the holder 18.

FIG. 7 shows by way of example the progress as a function of time of the power of a laser pulse as described within the context of FIGS. 2 and 3, but also applicable in the embodiments shown in FIGS. 5, 6 and 8.

For a period of about 14 ms, the laser pulse is maintained at a power P1 of about 350 W. As a result, the metal part 1 melts across a certain diameter, for example 600 μm. The resultant melt is clean and free from peaks. Then a short-lasting laser pulse with a power of P2 is directed for 0.1–0.3 ms towards the melt. Depending on, amongst other things, the width of the crack between the metal part 1 and the ceramic part 2 and the diameter of the melt 7, the power P2 ranges between 700 W and 2.5 kW. This short-lasting high-power pulse results in a short-lasting evaporation to the vapor cloud 11 (see FIG. 3). The formation of the vapor cloud leads to the exertion of a pressure on the melt 7 in the direction of the hole 3 in the ceramic part 2.

EXAMPLE

In a device held in an electron source in a vacuum it is necessary to connect a metal plate, which forms a grid in the electron source, and a ceramic plate with great positional accuracy and temperature stability. Both plates are flat and are connected together at various points. The plates have a thickness of between 250 and 380 μm and dimensions of the order of 1 cm. The through-holes 3 have a diameter of between 260 and 400 μ. The ceramic material is Al2O3. The laser beam 5 has a power of between 300 and 700 W and irradiates the metal for a period of 10 to 15 ms. The laser beam 5 has a spot size of approximately 600 μm. A sub-atmospheric pressure of 120 to 160 mb prevails in the holder 18. The slope of the walls 3 of the through-hole 4 is 20° to the normal.

The given values provide the possibility of creating the metal-ceramic bond between the metal part 1 and the ceramic part 2 with a high positional accuracy and a high temperature stability. Likewise, the use of the metal to be bonded itself as the basic part for the melt ensures that no contamination by, for example, solder or another flux can occur. The use of the metal itself to create the melt without the addition of other materials also has the effect that the bond is extremely robust. The positional accuracy is fully determined by the accuracy with which the metal part and the ceramic part are positioned and retained in relation to each other prior to connection.

After the foregoing description, many embodiments and modifications will be evident to those skilled in the art. All of these modifications and embodiments are considered to be within the scope of the invention.

What is claimed is:

1. A method of connecting a metallic material with a ceramic material, comprising:

providing a through-hole in the ceramic material;

disposing the metallic material proximate to the through-hole of the ceramic material;

producing molten metal by melting at least a portion of the metallic material adjacent to the through-hole of the ceramic material; and facilitating at least a portion of the molten metal to pass through the through-hole by causing a pressure difference between a first area on a side of the metallic material remote from the ceramic material and a second area on a side of the ceramic material remote from the metallic material, such that pressure is higher in the first area than in the second area.

2. The method of claim 1, wherein the pressure difference is at least partially created by applying a sub-atmospheric pressure on the side of the ceramic material remote from the metallic material.

3. The method of claim 1, wherein the pressure difference is at least partially created by applying a pressure above atmospheric pressure on the side of the metallic material remote from the ceramic material.

4. The method of claim 3, wherein, after said melting, the pressure difference is at least partially created by causing some of the molten metal on the side of the metallic material remote from the ceramic material to evaporate.

5. The method of claim 4, wherein the evaporation is at least partially caused by subjecting the side of the molten metal to laser radiation which causes a surface layer of the molten metal to evaporate.

6. The method of claim 1, including allowing the molten metal to solidify to form a locking form between the metallic material and the ceramic material.

7. The method of claim 1, wherein, during the period when the pressure difference prevails, a stop means is present opposite the through-hole on the side of the ceramic material remote from the metallic material.

8. The method of claim 7, wherein the surface material of the stop means is non-adhesive in relation to the molten metal.

9. The method of claim 8, wherein the surface material of the stop means is a ceramic material.

* * * * *